(12) United States Patent
Bilde

(10) Patent No.: US 8,968,065 B2
(45) Date of Patent: Mar. 3, 2015

(54) COMBINE HARVESTER GRAIN CLEANING APPARATUS

(75) Inventor: Morten Leth Bilde, Langaa (DK)

(73) Assignee: AGCO A/S, Randers (DK)

( * ) Notice: Subject to any disclaimer, the term of this patent is extended or adjusted under 35 U.S.C. 154(b) by 46 days.

(21) Appl. No.: 13/979,193

(22) PCT Filed: Dec. 15, 2011

(86) PCT No.: PCT/EP2011/073003
§ 371 (c)(1),
(2), (4) Date: Aug. 5, 2014

(87) PCT Pub. No.: WO2012/095240
PCT Pub. Date: Jul. 19, 2012

(65) Prior Publication Data
US 2014/0370947 A1 Dec. 18, 2014

(30) Foreign Application Priority Data
Jan. 11, 2011 (GB) .................................. 1100417.3

(51) Int. Cl.
*A01F 12/30* (2006.01)
*A01F 12/44* (2006.01)
(52) U.S. Cl.
CPC ................ *A01F 12/30* (2013.01); *A01F 12/44* (2013.01)
USPC ............................................ 460/91; 460/90
(58) Field of Classification Search
USPC ........................ 460/8, 9, 85, 90–96, 101, 102
See application file for complete search history.

(56) References Cited

U.S. PATENT DOCUMENTS

| 3,478,750 A | 11/1969 | Dahlquist |
| 3,757,797 A * | 9/1973 | Mathews ........................ 460/91 |
| 3,913,589 A | 10/1975 | Rouse et al. |
| 5,527,219 A * | 6/1996 | Schumacher et al. ........ 460/101 |
| 2013/0116018 A1* | 5/2013 | Ricketts et al. .................... 460/9 |

FOREIGN PATENT DOCUMENTS

| DE | 3720696 C1 | 7/1988 |
| GB | 1397939 A | 6/1975 |

OTHER PUBLICATIONS

International Search Report for International Application No. PCT/EP2011/073003 Dated Mar. 13, 2012.
UK Search Report for UK Application No. 1100417.3 Dated May 6, 2011.

* cited by examiner

*Primary Examiner* — Alicia Torres

(57) ABSTRACT

A combine harvester comprises a separating apparatus arranged to receive a threshed crop stream and convey rearwardly. The separating apparatus comprises a grate for allowing grain and chaff to fall onto an underlying separator pan, the separator pan being driven in an oscillating manner to convey a grain/chaff stream forwardly for delivery to a cleaning unit. The separator pan comprises a first portion and a second portion disposed forwardly of the first portion. A rear edge of the second portion is releasably attached to a front edge of the first portion, the second portion being pivotable around a forward mounting around a transverse axis between an operating position in which the second portion is attached to the first portion forming a continuous pan surface, and a lowered position in which the second portion is detached from the first portion giving maintenance access to the underside of the separating apparatus.

8 Claims, 6 Drawing Sheets

COMBINE HARVESTER GRAIN CLEANING APPARATUS

CROSS-REFERENCE TO RELATED APPLICATION

The present application claims the benefit of and priority from United Kingdom Application No. 1100417.3, filed Jan. 11, 2011, the entire disclosure of which is hereby incorporated by reference.

FIELD OF THE INVENTION

The invention relates to the processing of a crop stream in a combine harvester and more particularly to the construction of the oscillating pans which convey grain and chaff separated from the straw to a cleaning unit.

BACKGROUND

For many decades, self-propelled combine harvesters have been used by farmers to harvest a wide range of crops including cereals, maize and oil-seed rape. Typically, a combine harvester cuts the crop material, threshes the grain therefrom, separates the grain from the straw, and cleans the grain before storing in an onboard tank. Straw and crop residue is ejected from the rear of the machine.

Combines of the transverse threshing type comprise a threshing cylinder which rotates on a transverse axis and serves to thresh a harvested crop stream. Grain and chaff separated in this process falls under gravity through a grate onto an underlying thresher pan which is driven in an oscillating manner to convey the grain and chaff rearwardly to a rear edge from where the grain and chaff falls under gravity into a cleaning unit. The remainder of the crop stream from the threshing process is conveyed rearwardly from the threshing cylinder into separating apparatus which may include a plurality of straw walkers or one or more axial rotors. During the separating process further grain and chaff is removed from the straw and falls under gravity through a grate onto an underlying separator pan which is also driven in an oscillating manner to convey the grain and chaff forwardly to a front edge from where it falls under gravity into the cleaning unit. The straw by-product from the separating apparatus is ejected from the rear of the combine.

SUMMARY OF INVENTION

It is an object of the invention to improve access to the separating apparatus for the purposes of maintenance.

In accordance with the invention there is provided a combine harvester comprising separating apparatus arranged to receive a threshed crop stream and convey in a rearward direction, the separating apparatus comprising a grate for allowing grain and chaff to fall under gravity onto an underlying separator pan, the separator pan being driven in an oscillating manner to convey a grain/chaff stream forwardly for delivery to a cleaning unit, the separator pan comprising a first portion suspended from a combine frame by front and rear suspension means, and a second portion disposed forwardly of the first portion and pivotally mounted at the forward end, wherein a rear edge of the second portion is releasably attached to a front edge of the first portion, the second portion being pivotable around the forward mounting around a transverse axis between an operating position in which the second portion is attached to the first portion forming a continuous pan surface, and a lowered position in which the second portion is detached from the first portion to give maintenance access to the underside of the separating apparatus.

Advantageously, by constructing the separator pan in two portions in this way, a maintainer can simply lower the front portion to gain access to the underside of the separating apparatus.

The second (forward most) portion is preferably attached to a drive mechanism which delivers a reciprocating drive motion, and wherein the first (rear most) portion is driven via its connection to the second portion.

The drive mechanism may comprise a lever which is pivotally mounted between first and second ends to the combine frame for oscillating movement around a transverse axis, the first end of the lever being in driving connection with the separator pan, and a connecting rod connected between a reciprocating drive source and the second end of the lever. The reciprocating drive source may also be in driving connection with the cleaning unit.

The drive mechanism is preferably mounted outside the combine frame, and the driving connection between the first end of the lever and the separator pan passes through a hole in the frame. Advantageously, this permits easy access to the drive mechanism for maintenance and disassembly. Furthermore, the outside placement of the drive mechanism allows the thresher pan and separator pan components to be assembled and disassembled more easily.

The drive mechanism is preferably connected to a transverse shaft which lies on the transverse axis around which the second portion pivots when moved between the operating position and the lowered position.

The front and/or rear suspension means preferably comprises a pair of pivoting links which respectively support the first portion on the left and right-hand side.

The rear edge of the second portion may be releasably attached to a front edge of the first portion by a pair of hooks associated with one portion and which engage with a transverse bar associated with the other portion. Alternatively, any practical type of quick coupling or bolts may be employed to connect the two portions together.

A significant advantage of providing the separator pan in two portions is the ease of access to the components above the separator pan for maintenance or repair without having to dismount and remove the entire separator pan. Furthermore, the lowered front portion creates a suitable access ramp which can support a maintainer and this avoid damage to the sieves below.

BRIEF DESCRIPTION OF THE DRAWINGS

Further advantages of the invention will become apparent from reading the following description of specific embodiments with reference to the appended drawings in which:—

DESCRIPTION OF EXAMPLE EMBODIMENT

From reading the following description it should be understood that the terms longitudinal and transverse are made in relation to the combine harvester's normal direction of travel. In other words, the term 'longitudinal' equates to the fore and aft direction, whereas the term 'transverse' equates to the crosswise direction, or left and right. Furthermore, the terms 'axial' and 'radial' are made in relation to a rotating body such as a shaft wherein axial relates to a direction along the rotation axis and radial equates to a direction perpendicular to the rotation axis.

Figure 1:
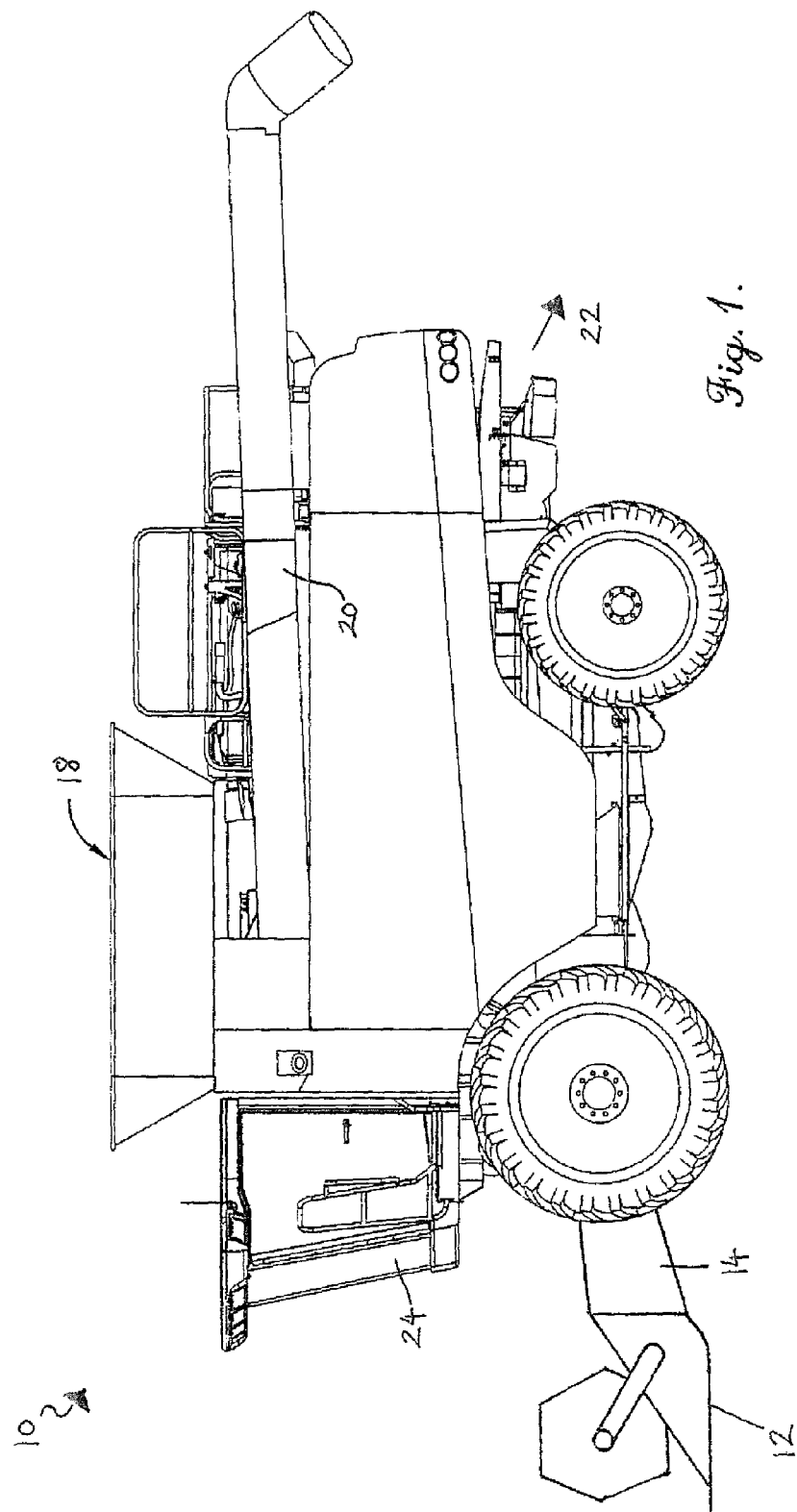
FIG. 1 is a side elevation of a combine harvester in accordance with the invention.

With reference to FIG. 1, a self-propelled combine harvester 10 comprises a header 12 which cuts and gathers a strip of crop as the combine harvester is driven across a crop field. An elevator section 14 conveys the crop stream from the header 12 into a central processing apparatus 16 described in more detail below. Clean grain separated from the crop stream is collected in a storage tank 18 which is periodically emptied into a trailer (not shown) via an unloading auger 20. Residue material remaining from the crop stream such as straw and chaff is ejected from the rear of the machine represented by arrow 22. For completeness the combine 10 includes a driver's cab 24.

Figure 2:
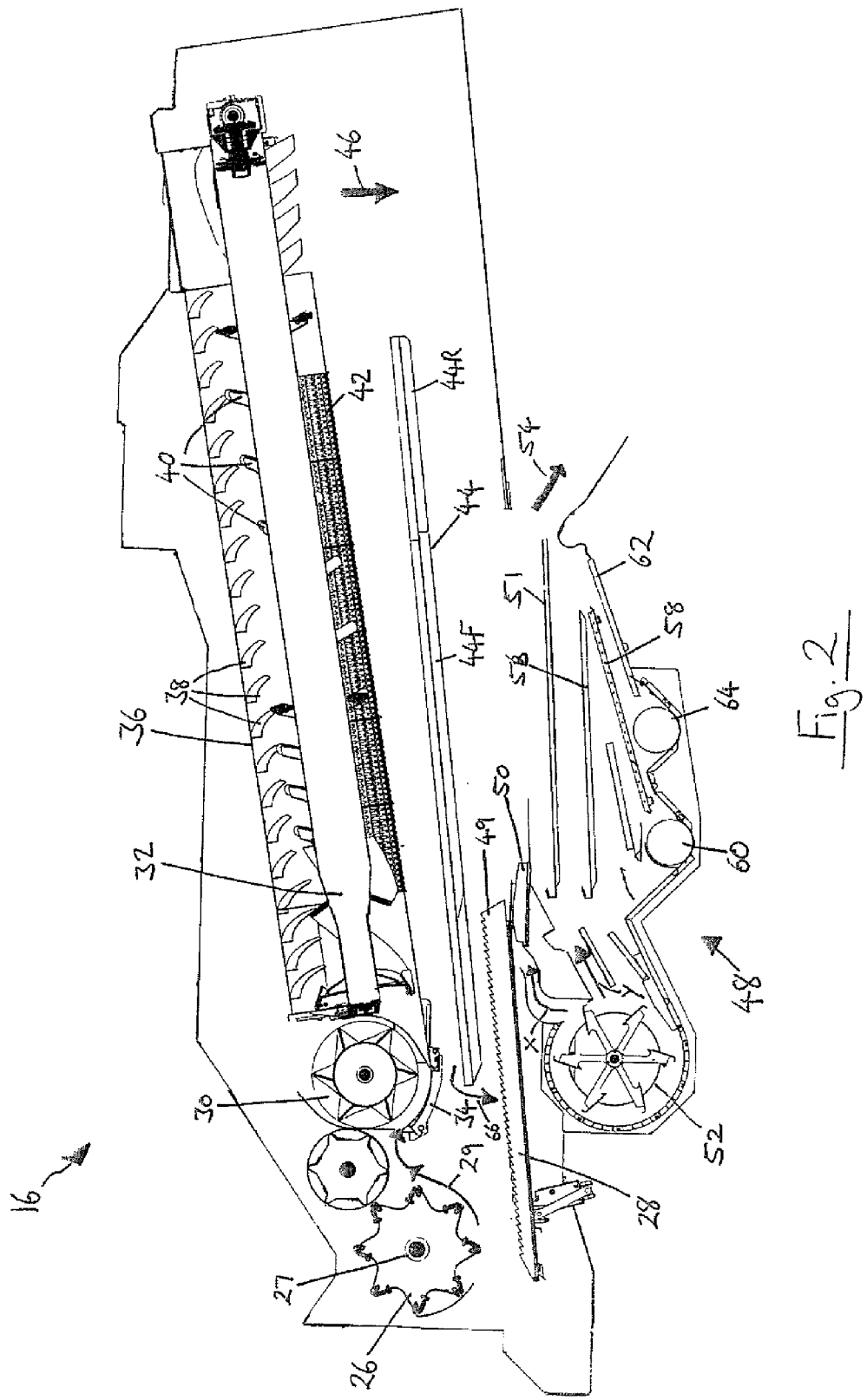
FIG. 2 is a sectional view through the crop processing apparatus of the combine harvester of FIG. 1.

Turning to the details of the crop processing apparatus 16, as shown in FIG. 2, the crop stream passes from the elevator 14 into a threshing unit 26 in the form of a transverse threshing cylinder which rotates in a counter clockwise direction as seen in FIG. 2 around a transverse axis 27. As in known combines the crop stream is threshed between the threshing cylinder 26 and a concaved surface (not shown). Grain and chaff separated in this process falls through a grate in the concave onto an underlying thresher pan 28 forming a primary grain/chaff stream. The residue straw is conveyed rearwardly as represented by arrow 29 from the threshing unit to a transverse transfer beater 30 which also rotates counter clockwise as viewed in FIG. 2. From here the crop stream is divided into two sub-streams and passed into respective longitudinally-aligned separating rotors. It will be appreciated that only one rotor 32 is shown in FIG. 2. The transfer beater 30 has associated therewith a concave grate 34 through which further grain and chaff may fall under gravity onto the underlying thresher pan 28.

The separator apparatus in this case comprises a pair of longitudinal rotors 32, which rotate around a substantially longitudinal axis as in known axial and hybrid combines. Each separating rotor 32 has associated therewith a substantially cylindrical cage 36 within which the rotor rotates. Upon the inside upper peripheral surface of the rotor cages 36 a plurality of guide vanes 38 are mounted for cooperation with fingers 40 mounted to the rotating rotor 32 which together separate the remaining grain from the stream of straw. The lower portion of each cage 36 has a grate 42 formed therein which allows separated grain and chaff to fall under gravity onto an underlying separator pan 44 forming a secondary grain/chaff stream.

The residue straw is ejected from the process apparatus 16 at the rear of the rotors 32 as indicated by arrow 46.

Although the above described separating apparatus comprises a pair of longitudinal rotors operating on the axial separation principle, it is envisaged that these may be replaced with straw walkers known in conventional combines without deviating from the scope of the invention.

Both the thresher pan 28 and separator pan 44 are driven in an oscillating manner known in the art so as to convey the respective grain/chaff streams rearwardly and forwardly respectively. The drive mechanism for the thresher pan 28 and separator pan 44 will be described in more detail below.

After falling onto the thresher pan 28 the primary grain/chaff stream is conveyed rearwardly by the oscillating motion. During conveyance the grain and chaff is stratified meaning that the heavy grain sinks to the bottom of the material layer and the lighter chaff rises to the top. This stratification of the material is of great importance and has a significant positive influence on the following cleaning process executed by the cleaning unit 48. To explain this further the stratified grain and chaff stream falls under gravity from the rear edge 49 of the thresher pan 28 into the cleaning unit 48. The grain and chaff initially falls onto a cascade pan 50 before falling from the rear edge thereof onto a first sieve 51.

A fan 52 generates a cleaning airstream, a portion of which is directed rearwardly between the thresher pan 28 and cascade pan 50 as represented by arrow X. The aforementioned stratification allows the lighter chaff to be blown rearwardly and carried by the airstream out of the rear of the machine as represented by arrow 54 in an uninterrupted manner whilst the heavier grain falls onto the cascade pan 50.

Without the stratification higher velocity airflow would be required to carry an equivalent proportion of chaff from the crop stream resulting in a higher grain loss. It will be appreciated by the skilled person that such stratification process increases the overall capacity of the cleaning unit 48.

The crop stream falls from the rear edge of the cascade pan 50 onto the first sieve 51 as described above. A further airstream represented by arrow Y is directed rearwardly between the cascade pan and first sieve 51 and also between the successive sieves. Again, the cascading motion of the grain and chaff allows the airstream Y to convey further chaff to the rear of the cleaning unit. First sieve 51 is coarser (with larger holes) than second sieve 56 which is located under first sieve 51.

First sieve 51 and second sieve 56 are driven in an oscillating manner. Straw and material which is too large to pass through first sieve 51 is conveyed rearwardly by the oscillating motion before falling from the rear edge and out of the rear of the combine.

Tailings, or unthreshed grain, and grain passes through first sieve 51 onto second sieve 56. Grain falls through second sieve 56 onto an underlying collection pan 58 which directs the clean grain to a transverse delivery auger 60 for delivering the grain to the storage tank 18.

The tailings which cannot pass through the holes in second sieve 56 are conveyed rearwardly by the oscillating motion before falling from the rear edge of the sieve 56 onto a tailings collection pan 62 which delivers the tailings to a rethreshing delivery auger 64.

The front of the separator pan 44 overlaps with the thresher pan 28 in a vertically spaced relationship. This causes the secondary grain/chaff stream to be conveyed forwardly by a distance so that the secondary crop stream falls onto the, at least partly, stratified primary crop stream on the thresher pan 49 as represented by arrow 66. The secondary grain/chaff stream therefore combines with the primary grain/chaff stream both of which are conveyed together in a rearward direction by the thresher pan 28. Advantageously, this causes stratification of the secondary grain/chaff stream which originates from the separating apparatus. Therefore, the majority of the grain and chaff cascading into the cleaning unit 48 from the rear edge 49 of thresher pan 28 is stratified thereby increasing the capacity of the cleaning unit 48.

The overlap distance between the thresher pan 28 and separator pan 44 is chosen to provide sufficient distance for the secondary grain/chaff stream to stratify whilst not interfering with the stratification of the primary grain/chaff stream. Excessive overlap has been found to reduce the capacity of the thresher pan 28 and it is preferable for the secondary grain/chaff stream to fall upon the primary grain/chaff stream. In this example the overlap is 800 millimeters although it will be appreciated that the optimal overlap will differ from machine to machine. In general the overlap should be at least one third of the distance that the primary crop stream is conveyed by the thresher pan whilst being no more than two thirds of that same distance.

Figure 3:
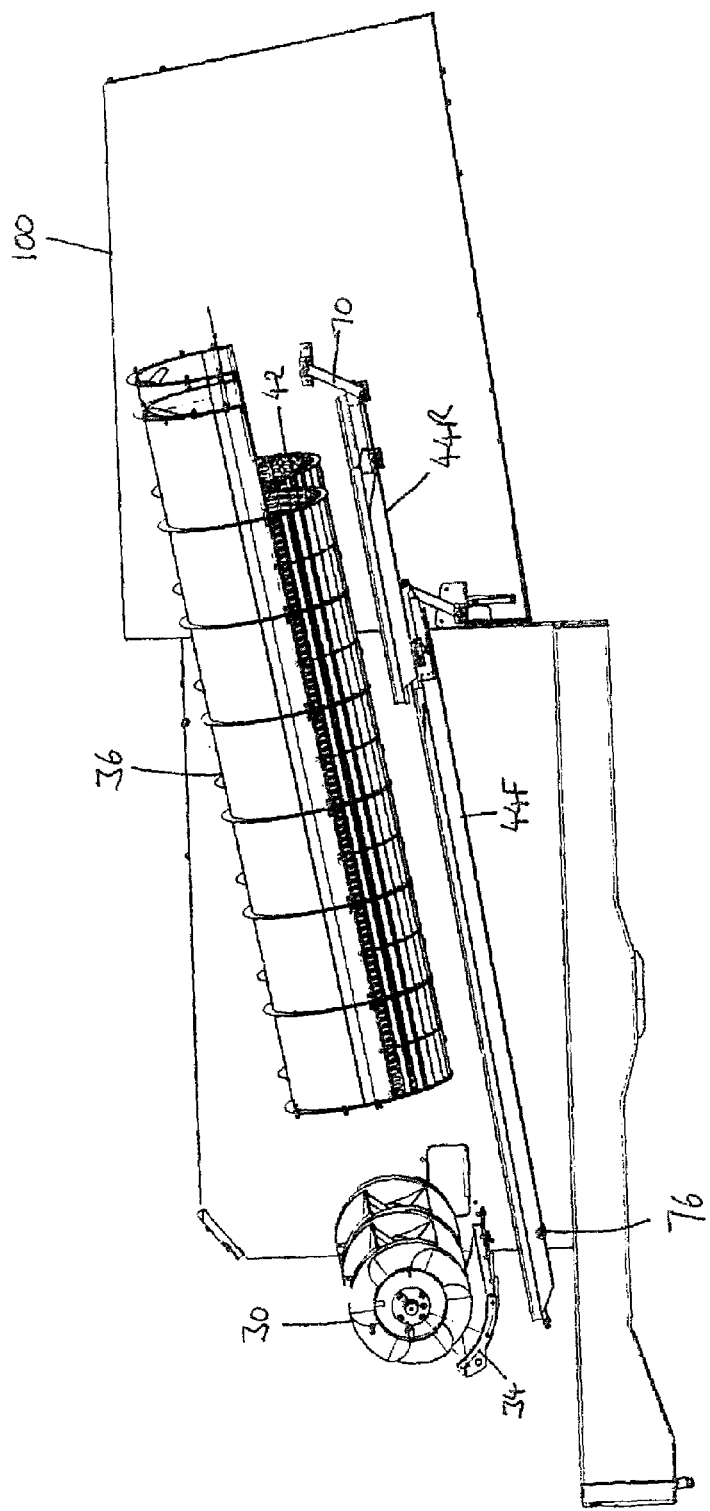
FIG. 3 is a perspective view showing part of the crop processing apparatus of FIG. 2 showing the front portion of the separator pan in an operating position.
Figure 5:
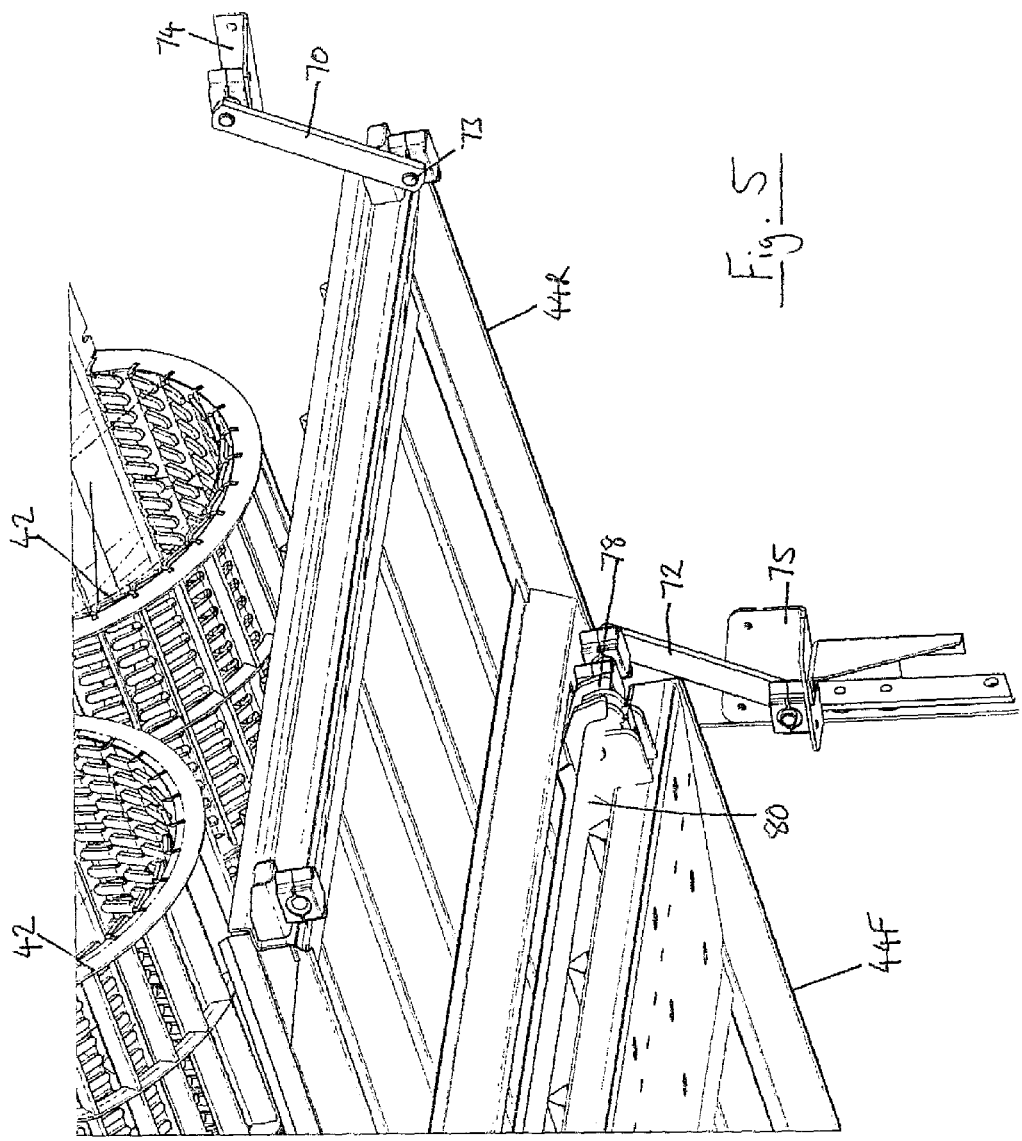
FIG. 5 is a perspective view of the underside of the rear portion of the separator pan; and, FIG. 6 is a perspective external view of the separator pan drive mechanism.

Turning to the construction of the separator pan 44, in accordance with the invention, the overall length is provided by a rear portion 44R and a front portion 44F. The rear portion 44R, as also shown in FIGS. 3 and 5, is suspended from the combine frame 100 by a pair of rear links 70 and a pair of front links 72. It will be appreciated that only one link from each pair is shown in FIGS. 3 and 5 for clarity. With particular reference to FIG. 5, each rear link 70 is pivotally connected to a respective rear corner of the rear portion of the separator pan 44R. The pivotal connection is made by a transverse pin 73 which is inserted into a hole of the rear link 70 at one end. At the distal end of rear link 70 a further pivoting connection is made with a bracket 74 which is secured to the combine frame 100.

Turning attention to the pair of front links 72 a similar construction is adopted in that each link 72 is pivotally connected at one end to a respective front corner of the separator pan rear portion 44R and at an opposite end to a bracket 75 which is secured to the combine frame 100. Together the front links 70 and rear links 72 suspend the rear portion of the separator pan 44R in a manner which allows fore and aft oscillating movement.

It should be understood that the front linkage 70 and rear linkage 72 may adopt a different construction whilst allowing the required oscillating movement of the separator pan 44. For example the rear corners of the rear portion of separator pan 44R may be suspended from below whist the front corners may be suspended from above.

Figure 4:
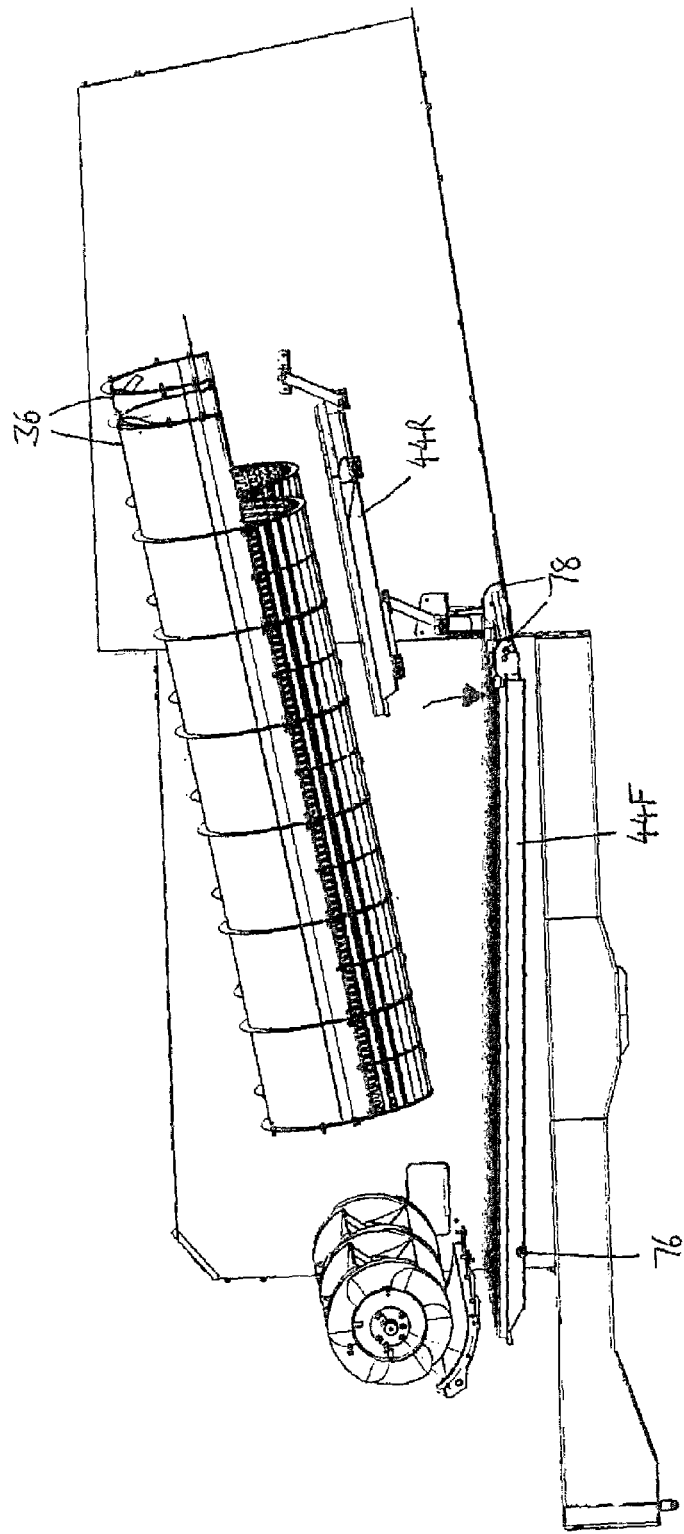
FIG. 4 shows the same view as FIG. 3 but with the front portion of the separator pan in a lowered position.

Turning attention to the front portion 44F of separator pan 44 a transverse shaft 76 as seen in FIG. 3 provides a front support for the separator pan 44. The front portion 44F can pivot around the transverse support shaft 76 between an operating position (as shown in FIG. 3) and a lowered position (as shown in FIG. 4). At its rear edge the front portion 44F includes a pair of hooks 78 which engage a transverse bar 80 connected to the rear portion 44R. The hook 78 and bar 80 provide a releasable connection between the rear portion 44R and front portion 44F of the separator pan 44. It will be appreciated that the hooks may be associated with the rear portion 44R whilst the transverse bar may be disposed on the front portion 44F without deviating from the scope of the invention.

The releasable mechanism allows an operator to lower the front portion 44F into the lowered position as shown in FIG. 4 to gain access to the underside of the separating apparatus, in this case the rotor cages 36.

Figure 6:
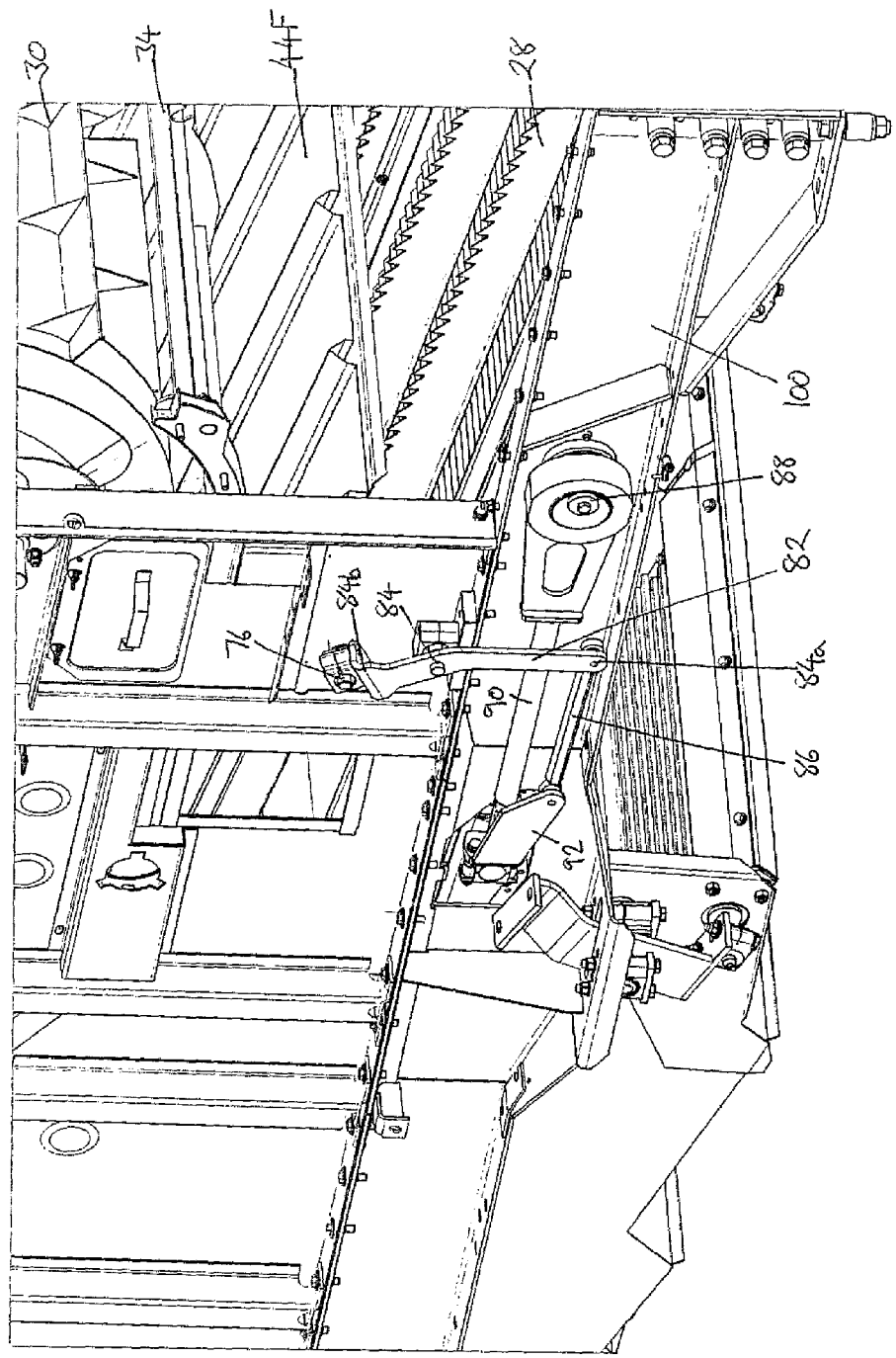

The separator pan 44 receives its drive force from a drive connection with the drive to the cleaning unit. As best seen in FIG. 6, a lever 82 is pivotally mounted at 84 to the outside of combine frame 100. At its driven end 84a the lever is pivotally connected to a first connecting rod 86 which, in turn, is connected at its distal end to a reciprocating drive mechanism attached to the cleaning unit 48. At its driven end 84b the lever 84 is connected to the transverse support shaft 76 which passes through a slot (not shown) in the combine frame.

For completeness, a crankshaft 88 is driven by a belt drive (not shown) which obtains power from the engine. The rotating crankshaft drives a second connecting rod 90 in a reciprocating motion so as to deliver a drive force to the cleaning unit 48. The first connecting rod 86 is pivotally connected to a bracket 92 which is bolted to the second connecting rod 90 so as to obtain the required reciprocating motion for the separator pan drive.

Conveniently, the exterior mounting of lever 84 and associated drive connections allows easy assembly and service access.

Turning back to FIG. 3, the reciprocating motion driving support shaft 76 provides the driving force to cause the entire separating pan 44 to oscillate. It should be understood that the drive force is conveyed to the rear portion 44R via the releasable connection between the two portions and that the rear portion is in fact mounted in a passive manner.

Although shown with a drive mechanism at the front of separator pan 44 it is envisaged that either or both parts of the separator pan 44 may be driven without deviating from the scope of the invention and indeed without losing the advantages provided by a two part construction.

The invention claimed is:

1. A combine harvester comprising a separating apparatus arranged to receive a threshed crop stream and convey in a rearward direction, the separating apparatus comprising a grate for allowing grain and chaff to fall under gravity onto an underlying separator pan, the separator pan being driven in an oscillating manner to convey a grain/chaff stream forwardly for delivery to a cleaning unit, the separator pan comprising a first portion suspended from a combine frame by front and rear suspension means, and a second portion disposed forwardly of the first portion and pivotally mounted at the forward end, wherein a rear edge of the second portion is releasably attached to a front edge of the first portion, the second portion being pivotable around the forward mounting around a transverse axis between an operating position in which the second portion is attached to the first portion forming a continuous pan surface, and a lowered position in which the second portion is detached from the first portion to give maintenance access to the underside of the separating apparatus.

2. A combine harvester according to claim 1, wherein the second portion is attached to a drive mechanism which delivers a reciprocating drive motion, and wherein the first portion is driven via its connection to the second portion.

3. A combine harvester according to claim 2, wherein the drive mechanism comprises a lever which is pivotally mounted between first and second ends to the combine frame for oscillating movement around a transverse axis, the first end of the lever being in driving connection with the separator pan, and a connecting rod connected between a reciprocating drive source and the second end of the lever.

4. A combine harvester according to claim 3, wherein the reciprocating drive source is also in driving connection with the cleaning unit.

5. A combine harvester according to claim 3, wherein the drive mechanism is mounted outside the combine frame, and the driving connection between the first end of the lever and the separator pan passes through a hole in the frame.

6. A combine harvester according to claim 2, wherein the drive mechanism is connected to a transverse shaft which lies on the transverse axis around which the second portion pivots when moved between the operating position and the lowered position.

7. A combine harvester according to claim 1, wherein the front and/or rear suspension means comprises a pair of pivoting links which respectively support the first portion on the left and right-hand side.

8. A combine harvester according to claim 1, wherein the rear edge of the second portion is releasably attached to a front edge of the first portion by a pair of hooks associated with one portion and which engage with a transverse bar associated with the other portion.

* * * * *